(12) United States Patent
Sohn et al.

(10) Patent No.: US 7,589,885 B2
(45) Date of Patent: *Sep. 15, 2009

(54) MICROMIRROR ARRAY DEVICE COMPRISING ENCAPSULATED REFLECTIVE METAL LAYER AND METHOD OF MAKING THE SAME

(75) Inventors: Jin Young Sohn, Fullerton, CA (US); Gyoung Il Cho, Seoul (KR); Cheong Soo Seo, Seongnam (KR)

(73) Assignees: Angstrom, Inc., Seongnam (KR); Stereo Display, Inc., Anaheim, CA (US)

( * ) Notice: Subject to any disclaimer, the term of this patent is extended or adjusted under 35 U.S.C. 154(b) by 62 days.

This patent is subject to a terminal disclaimer.

(21) Appl. No.: 11/534,620

(22) Filed: Sep. 22, 2006

(65) Prior Publication Data

US 2008/0074727 A1 Mar. 27, 2008

(51) Int. Cl.
*G02B 26/00* (2006.01)
*G02B 7/182* (2006.01)
*G02F 1/00* (2006.01)

(52) U.S. Cl. .................. 359/291; 359/237; 359/846

(58) Field of Classification Search .......... 359/290–292, 359/295, 223–225, 245, 260–263, 298, 198, 359/301–303, 317–318, 237, 242, 319–320, 359/846, 849–851, 853, 855, 871–872, 883–884
See application file for complete search history.

(56) References Cited

U.S. PATENT DOCUMENTS

| | | | |
|---|---|---|---|
| 2,002,376 A | 5/1935 | Mannheimer | |
| 4,407,567 A | 10/1983 | Michelet | |
| 4,834,512 A | 5/1989 | Austin | |
| 5,004,319 A | 4/1991 | Smither | |
| 5,212,555 A | 5/1993 | Stoltz | |
| 5,369,433 A | 11/1994 | Baldwin | |
| 5,402,407 A | 3/1995 | Eguchi | |
| 5,467,121 A | 11/1995 | Allcock | |
| 5,612,736 A | 3/1997 | Vogeley | |
| 5,696,619 A | 12/1997 | Knipe | |
| 5,881,034 A | 3/1999 | Mano | |
| 5,897,195 A | 4/1999 | Choate | |
| 5,986,811 A | 11/1999 | Wohlstadter | |
| 6,025,951 A | 2/2000 | Swart | |
| 6,028,689 A | 2/2000 | Michaliek | |
| 6,064,423 A | 5/2000 | Geng | |
| 6,084,843 A | 7/2000 | Abe | |
| 6,104,425 A | 8/2000 | Kanno | |
| 6,111,900 A | 8/2000 | Suzudo | |
| 6,123,985 A | 9/2000 | Robinson | |
| 6,233,087 B1 * | 5/2001 | Hawkins et al. ............. 359/290 |
| 6,282,213 B1 | 8/2001 | Gutin | |
| 6,315,423 B1 | 11/2001 | Yu | |
| 6,329,737 B1 | 12/2001 | Jerman | |

(Continued)

*Primary Examiner*—Scott J Sugarman
*Assistant Examiner*—Dawayne A Pinkney

(57) ABSTRACT

The present invention provides an optical micromirror device and their array device and method for making the same. By introducing a sub coating layer and an over coating layer with a high reflective metal layer, the reflective layer of the micromirrors is protected from environmental circumstances, oxidation, degradation, acid, base, and galvanic corrosion of the micro-mechanical structures. Also the new coating structure enhances the performance of the micromirror array device by reducing degradation of the reflectivity of the metal layer, by providing anti-reflection in the optically non-effective area, and by protecting the micro-mechanical structures.

66 Claims, 6 Drawing Sheets

U.S. PATENT DOCUMENTS

| | | |
|---|---|---|
| 6,498,673 B1 | 12/2002 | Frigo |
| 6,507,366 B1 | 1/2003 | Lee |
| 6,549,730 B1 | 4/2003 | Hamada |
| 6,625,342 B2 | 9/2003 | Staple |
| 6,649,852 B2 | 11/2003 | Chason |
| 6,650,461 B2 | 11/2003 | Atobe |
| 6,658,208 B2 | 12/2003 | Watanabe |
| 6,711,319 B2 | 3/2004 | Hoen |
| 6,741,384 B1 | 5/2004 | Martin |
| 6,784,771 B1 | 8/2004 | Fan |
| 6,833,938 B2 | 12/2004 | Nishioka |
| 6,885,819 B2 | 4/2005 | Shinohara |
| 6,900,901 B2 | 5/2005 | Harada |
| 6,900,922 B2 | 5/2005 | Aubuchon |
| 6,906,848 B2 | 6/2005 | Aubuchon |
| 6,906,849 B1 | 6/2005 | Mi |
| 6,914,712 B2 | 7/2005 | Kurosawa |
| 6,919,982 B2 | 7/2005 | Nimura |
| 6,934,072 B1 | 8/2005 | Kim |
| 6,934,073 B1 | 8/2005 | Kim |
| 6,958,777 B1 | 10/2005 | Pine |
| 6,970,284 B1 | 11/2005 | Kim |
| 6,995,909 B1 | 2/2006 | Hayashi |
| 6,999,226 B2 | 2/2006 | Kim |
| 7,023,466 B2 | 4/2006 | Favalora |
| 7,031,046 B2 | 4/2006 | Kim |
| 7,046,447 B2 | 5/2006 | Raber |
| 7,068,416 B2 | 6/2006 | Gim |
| 7,077,523 B2 | 7/2006 | Seo |
| 7,161,729 B2 | 1/2007 | Kim |
| 2002/0018407 A1 | 2/2002 | Komoto |
| 2002/0102102 A1 | 8/2002 | Watanabe |
| 2002/0135673 A1 | 9/2002 | Favalora |
| 2003/0058520 A1 | 3/2003 | Yu |
| 2003/0071125 A1 | 4/2003 | Yoo |
| 2003/0174234 A1 | 9/2003 | Kondo |
| 2003/0184843 A1 | 10/2003 | Moon |
| 2004/0009683 A1 | 1/2004 | Hiraoka |
| 2004/0012460 A1 | 1/2004 | Cho |
| 2004/0021802 A1 | 2/2004 | Yoshino |
| 2004/0052180 A1 | 3/2004 | Hong |
| 2004/0246362 A1 | 12/2004 | Konno |
| 2004/0252958 A1 | 12/2004 | Abu-Ageel |
| 2005/0024736 A1 | 2/2005 | Bakin |
| 2005/0057812 A1 | 3/2005 | Raber |
| 2005/0136663 A1 | 6/2005 | Terence Gan |
| 2005/0174625 A1 | 8/2005 | Huiber |
| 2005/0180019 A1 | 8/2005 | Cho |
| 2005/0212856 A1 | 9/2005 | Temple |
| 2005/0224695 A1 | 10/2005 | Mushika |
| 2005/0225884 A1 | 10/2005 | Gim |
| 2005/0231792 A1 | 10/2005 | Alain |
| 2005/0264867 A1 | 12/2005 | Cho |
| 2005/0264870 A1 | 12/2005 | Kim |
| 2006/0012766 A1 | 1/2006 | Klosner |
| 2006/0012852 A1 | 1/2006 | Cho |
| 2006/0028709 A1 | 2/2006 | Cho |
| 2006/0187524 A1 | 8/2006 | Sandstrom |
| 2006/0209439 A1 | 9/2006 | Cho |

\* cited by examiner

MICROMIRROR ARRAY DEVICE COMPRISING ENCAPSULATED REFLECTIVE METAL LAYER AND METHOD OF MAKING THE SAME

FIELD OF INVENTION

The present invention relates to fabrication of micromirror device, more specifically, micromirror array fabrication and structure.

BACKGROUND OF THE INVENTION

Since the Digital Micromirror Device (DMD) was invented, many an optical micromirror device has been introduced. Micromirror related devices are usually light reflecting and light modulating devices. Especially controlling light and having a good quality of reflectivity is essential to the device as well as the operation of the micromirror devices. To improve the optical quality of the micromirror device, scientists and engineers have been making efforts for developing new optical coatings and new structures for micromirror devices.

Hornbeck discloses a micromirror array device with metal layer made of aluminum alloy in U.S. Pat. No. 5,083,857. Since the micromirror array was made by the aluminum alloy, the micromirror array device has a reflectivity of metal. It has a good performance of light reflecting and modulating. Even though aluminum alloy has a high reflectivity, the metal surface is degraded by oxidation. Since the metal layer was exposed to the environments, the reflectivity of the micromirror was slowly degraded by oxidation.

To enhance the optical properties of the micromirror device, anti-reflective coatings are also investigated. Some example can be found in the U.S. Pat. No. 6,282,010 to Sulzbach, and the U.S. Pat. No. 7,009,745 to Miller. In those patents, the structures under the reflective surface are coated with anti-reflective materials. Since the structure of the micromirror device was made with metal or metal alloy, the structure itself has a relatively high reflectivity. The residual light reflected from the metal surface other than reflective mirror surface made serious problems for generating images with high resolution and high quality. The anti-reflection coating for the structure enhanced the optical quality of the micromirror device. But the enhancement was not enough and the process for anti-reflective coating was complex and difficult.

By introducing wafer bonding and transparent substrates, a different structure for micromirror device was disclosed by Huibers in the U.S. Pat. No. 5,835,256. The device has a better protection for reflective mirror surface, but the fabrication of the device becomes considerably difficult with fabrication on the transparent wafer and wafer bonding of two different wafers. One more problem is that this structure experiences a thermal degradation of the reflectivity.

More recently, another micromirror array device was disclosed in U.S. Pat. No. 6,970,284 to Kim, U.S. Pat. No. 7,031,046 to Kim, U.S. Pat. No. 6,934,072 to Kim, U.S. Pat. No. 6,934,073 to Kim, U.S. Pat. No. 6,999,226 to Kim. The Micromirror Array Lens acts as a variable focusing lens by controlling micromirrors in the Micromirror Array Lens. The micromirrors in the Micromirror Array Lens need a good quality of optical coating as well as protection for the micro-mechanical structures.

Good quality of optical coating is closely related to the performance of the micromirror array device. Since the micromirror array device acts as a spatial light modulator, the high reflective surface of the micromirrors is essential to the device. Also the protection of the micro-mechanical structure is a must to have precise motion control of the micromirror array device. The purpose of the present invention is to solve these problems and improving the performance of the micromirror array device. Newly introduced structure and method for fabrication in the present invention critically improves the optical properties of the micromirror array device and also provides protection for the micromirror structures.

In the present invention, a new structure and method for enhancing optical properties as well as protection of the micro-mechanical structures is developed. The present invention is dedicated to solve the following problems: oxidation of the metal coating, degradation of the reflective coating layer, protection of micro-mechanical structures and reflective surface from the acid or base, protection of reflective surface from severe environments, providing the anti-reflective coating for optically non-effective area, providing protective layer for reflective surface, and simplifying the process of fabrication.

SUMMARY OF THE INVENTION

The object of the present invention is to provide a micromirror device, a micromirror array device and a method for making the same. While fabricating the micromirror device and the micromirror array device, there remain lots of obstacles for having a good quality of operation. Especially providing a good optical quality is very important in making micromirror and micromirror array device. The present invention provides a micromirror array device with special coating structures. By introducing a sub coating layer and an over coating layer with a high reflective metal layer, the reflectivity of the micromirrors in the micromirror array device is preserved and protected from environmental circumstances, oxidation, degradation, acid, base, and galvanic corrosion of the micro-mechanical structures.

The properties of the micromirror array device with optical performance and its structures can be found in US Patent Publication No. 20050280883 A1, US Patent Publication No. 20060012852 A1, US Patent Publication No. 20060152792 A1, US Patent Publication No. 20060203358 A1, U.S. patent application Ser. No. 11/426,565 filed on Jun. 26, 2006, and U.S. patent application Ser. No. 11/463,875 filed on Aug. 10, 2006, all of which are hereby incorporated by references.

By using a micromirror array, a Micromirror Array Lens was developed as one of the micromirror array applications. The details of the Micromirror Array Lens is disclosed in U.S. Pat. No. 6,970,284 to Kim, U.S. Pat. No. 7,031,046 to Kim, U.S. Pat. No. 6,934,072 to Kim, U.S. Pat. No. 6,934,073 to Kim, U.S. Pat. No. 6,999,226 to Kim, U.S. Pat. No. 7,095,548 to Cho, US Patent Publication No. 20050275929 A1, US Patent Publication No. 20050264870 A1, all of which are herby incorporated by references.

The micromirror array device of the present invention comprises a plurality of micromirrors. Each micromirror in optically effective area comprises a substrate with at least one electrode and at least one actuation element, a micromirror structure, a sub coating layer, a metal layer, and an over coating layer. The effective area is the area where the actual spatial light modulating is performed or where focusing of the Micromirror Array Lens is performed. By changing the motion of the micromirror in the effective area, the micromirror array device can make spatial light modulating and the Micromirror Array Lens can change its focal length, optical axis, and other focusing properties.

The substrate has at least one electrode to provide actuation force for micromirror motion. The actuation elements make micromirror motion controlled by electrostatic force induced between the electrodes in the substrate and the micromirror structure. All the elements which are related with the motion of the micromirror can be actuation elements. The micromirror structure has rotational and/or translational motions controlled by the actuation elements. The sub coating and the over coating layer encapsulate the metal layer to prevent the metal layer from oxidation and to prevent the micromirror structure and the actuation elements from galvanic corrosion. The metal layer makes the micromirror structure have high reflectivity. The encapsulation of the metal layer considerably reduces degradation of reflectivity by the metal layer. The sub coating and the over coating layer provide good protective layers for the metal layer.

The shape of the micromirrors can be varied with geometry of the micromirror array device. The micromirrors in the effective area have a shape selected from the group consisting of fan, rectangular, square, hexagonal, and triangular shapes. With an optical geometry with a rotational symmetry, a fan shape for micromirrors is a good choice for effective fabricating the micromirror array device such as the Micromirror Array Lenses. For an optical system with an axis-symmetry, micromirrors with rectangular or square shapes can be selected to have a proper geometry of the optical system. The hexagonal and triangular shape micromirrors are also used for systems with the axis-symmetry, especially with three-fold axis symmetry. Hexagonal micromirrors can be used for highly dense system. Anyway, the selection of the micromirror shapes is highly dependent on the optical system geometry and the devices.

The micromirror array device can be extended to have a function of a lens and act as a Micromirror Array Lens. The micromirror array for Micromirror Array Lens should satisfy two conditions to form a good lens. One is the convergence condition that every light should be converged into a focal point. The other is the phase matching condition that the phase of the converged light should be the same. In a conventional lens, the phase matching condition is that all the light passing through a lens should have the same optical path length to the focal point. But the Micromirror Array Lens arranged in a flat surface uses the periodicity of the light to satisfy the phase matching condition. Since the same phase condition occurs periodically, the phase matching condition can be satisfied even though the optical path length is different. Each micromirror in the Micromirror Array Lens can be controlled independently to satisfy the phase matching condition and the convergence condition.

Only after satisfying the convergence and the phase matching conditions, the micromirror array device can perform it function as a Micromirror Array Lens and build a lens with an optical surface profile. An optical surface profile is the surface shape of the micromirror array which meets the lens conditions of convergence and phase matching. Each micromirror in the effective area is independently controlled to form at least an optical surface profile. The Micromirror Array Lens can have a plurality of optical surface profiles to have a variable focusing property. By changing the optical surface profile, the Micromirror Array Lens can change its focal length, optical axis, and focusing properties. The Micromirror Array Lens can be a variable focusing lens having lots of optical profiles.

The substrate has at least one electrode, usually a plurality of electrodes for providing actuation force for micromirror motion. Each electrode is used for generating motion for micromirror. Sometimes groups of electrodes are used for micromirror motion. For controlling the micromirror, a control circuitry should be constructed. The substrate comprises a control circuitry constructed by using semiconductor microelectronics technologies such as MOS and CMOS technologies. By providing semiconductor microelectronics, the micromirror array device can have high flexibility in motion control with convenience.

To build electrostatic force between the electrodes and the actuation elements or micromirror structure, the electrodes should have a different electric potential from the electric potential of the actuation elements or the micromirror structure. To prevent from possible electric contact between the structures and elements, the electrodes are protected by passivation layer. The passivation layer prevents the electrodes from possible electric contact or problems with other structures in the micromirror structure. The passivation layer can be built with silicon oxide or low-stressed silicon nitride (LSN) since they have high electrical resistance and easy accessibility for fabrication.

To have simplicity in control circuitry, the micromirror array device can be built so that the micromirrors in the micromirror device are controlled together and has their respective motions with a common input signal. For the case of the Micromirror Array Lens, the micromirrors in the effective area are controlled to form an optical surface profile by a common electrical signal to the corresponding electrodes. With this method, the Micromirror Array Lens can be digitally or discretely controlled to have an optical surface profile with corresponding optical properties. Also the number of the inputs can be reduced by using common input signal down to the number of optical surface profiles. To control a certain amount of the optical surface profiles, only the same number of the electrical inputs is needed. Also the operating circuitry becomes extremely simple.

The sub coating and the over coating layer encapsulate the metal layer to prevent the metal layer from oxidation and to prevent the micromirror structure and the actuation elements from galvanic corrosion. The encapsulated metal layer is protected by the sub coating and the over coating from degradation of reflectivity and also from acid, base, or severe environments. The sub coating layer is deposited on the micromirror structure with material selected from the group consisting of silicon oxide ($SiO_2$), aluminum oxide ($Al_2O_3$), magnesium oxide (MgO), titanium oxide ($TiO_2$), cesium oxide ($CeO_2$), silicon nitride ($Si_3N_4$), titanium nitride (TiN), magnesium fluoride ($MgF_2$), zinc sulfide (ZnS), zinc selenide (ZnSe), polycarbonate, polyester, polyethylene naphthalate, and fluoropolymer.

To prevent the micromirror structure and the actuation elements from galvanic corrosion, the sub coating layer prevents the metal layer from electrical contacting with micromirror structure. Since the galvanic corrosion can only occur if the dissimilar metals are in electrical contact. When the dissimilar metals are insulated from each other by suitable plastic strips, washers or sleeves, the galvanic corrosion cannot occur. Thus the sub coating layer prevents the micromirror structure and the actuation elements from galvanic corrosion by electrically separating the micromirror structure and the metal layer. For micromirror array devices with electrostatic force actuation, the electrical separation is especially important. The sub coating material should be highly electrically insulating and also consistent with the fabrication processes. To have sufficient electrical separation and optical properties, the thickness of the sub coating layer should be controlled to have between 20 nm and 500 nm preferably 100 nm.

The metal layer is made of material selected from the group consisting of silver (Ag), aluminum (Al), gold (Ag), nickel (Ni), chromium (Cr), and platinum (Pt) for the micromirror structure to have high reflectivity. The thickness of the metal layer is controlled to have between 20 nm and 1000 nm preferably 100 nm. The thickness should be controlled to have high reflectivity of the micromirrors in the micromirror array device. Also the material of the metal layer should be selected by considering the required reflectivity, operating wavelength, operating environment, and others. Also since the metal layer is easy to be attacked from acid or base or other environmental reasons, the metal layer should be protected from them. In the present invention, the sub coating and the over coating provide a strong protection for the metal layer from oxidation, acid, base and galvanic corrosion by encapsulating the metal layer. The over coating layer and the sub coating layer prevent the metal layer from oxidation by encapsulating the metal layer. The over coating layer and the sub coating layer protect the metal layer from acid or base to maintain reflectivity of the micromirrors by encapsulating the metal layer. The degradation of the reflectivity is considerable reduced by encapsulation of the metal layer by the sub coating layer and the over coating layer. One more thing is that the over coating layer and the sub coating layer protect the metal layer from etchants while removing sacrificial layer or layers of the micro-mechanical structure. Usually while removing sacrificial layer or layers, a strong acid or base such as fluoric acid is applied to dissolve the sacrificial layers made of such as silicon oxide.

The over coating layer provides a protection for metal layer from the operating environments. Since the metal layer should have high reflectivity, the thickness of the over coating layer should be controlled to maximize reflectivity of the metal layer. The maximized reflectivity enhances the performance of the Micromirror Array Lens. The thickness of the over coating layer is controlled to have between 20 nm and 500 nm preferably 100 nm. Since the over coating layer is directly exposed to the operating environment, the thickness of the over coating layer is more important than that of the sub coating layer, especially to control the reflectivity of the micromirrors.

The sub coating layer is deposited on the micromirror structure with material selected from the group consisting of silicon oxide ($SiO_2$), aluminum oxide ($Al_2O_3$), magnesium oxide (MgO), titanium oxide ($TiO_2$), cesium oxide ($CeO_2$), silicon nitride ($Si_3N_4$), titanium nitride (TiN), magnesium fluoride ($MgF_2$), zinc sulfide (ZnS), zinc selenide (ZnSe), polycarbonate, polyester, polyethylene naphthalate, and fluoropolymer.

The micromirror array device further comprises an optically non-effective area which is other than the controlled micromirror area. Since the structure in the non-effective area does not need actuation parts, the structure of the non-effective area is somewhat different from that of effective area. The non-effective area comprises a substrate, at least one dummy structure, a sub coating layer, and an over coating layer. The sub coating and the over coating layers are fabricated together with the layers in the micromirrors in the effective area.

Since the micromirror array device is a fragile one, the micromirrors should be protected during the fabrication and the usage. To protect the micromirror structures in the optically effective area, the dummy structures are introduced and fabricated with the micromirror structures. The dummy structures protect the micromirrors in the effective area from external perturbation. The external perturbation can be occurred during fabrication of the micromirror array device and operation of the micromirror array device. The dummy structures enclose the effective area and act as a buffer area of the device. The dummy structures are also fabricated with the micromirror structures or elements in the effective area.

To enhance the optical performance of the micromirror array device, the non-effective area should not be optically active. The anti-reflective coating enhances the optical performance of the micromirror array device. Since the dummy structures do not have metal layer, the structures do not have high reflectivity, but still the dummy structures make effects on the optical quality. To enhance the optical performance, it is highly desired that the non-effective area has as low reflectivity as possible. An anti-reflective coating for the non-effective area is one solution. By controlling the thickness of the exist layers for the micromirrors, the non-effective area can have anti-reflective coating. In the non-effective area, two layers of sub coating and over coating layers are applied to the dummy structures. The total thickness of the sub coating and over coating layers can be controlled to have anti-reflective coating properties. To provide anti-reflective coating for non-effective area along with protection of the metal layer is the one of main ideas and advantages of the present invention.

In the present invention, the method for fabricating the micromirror device is also provided. The method for fabricating the micromirror array device comprises the steps of forming electrodes and control circuitry on a substrate, building micromirror actuation elements with sacrificial layer or layers, applying a micromirror structure layer, applying a sub coating layer to the micromirror structure, applying a metal layer to the sub coating layer on effective area, applying an over coating layer, selectively etching the sub coating layer, the over coating layer and the micromirror structure layer to make micromirror structures with coating layers, removing the sacrificial layers and releasing the actuation elements and the micromirror structures. The metal layer is encapsulated by the sub coating layer and the over coating layer to prevent the metal layer from oxidation and to prevent the micromirror structures and the actuation elements from galvanic corrosion. Also non-effective area can be made without extra process of fabrication. The only differences are that the non-effective area does not have metal layer since it does not need high reflectivity and that the non-effective area does not have actuation elements. The dummy structures in the non-effective area are more likely the micromirror structure without actuation part. There are lots of advantages for the method of the present invention. By applying the sub coating layer and the over coating layer, the metal layer can be protected from severe environments, oxidation, degradation of reflectivity, acid, base, and galvanic corrosion.

The sub coating and the over coating can provide optical properties to the effective and non-effective area as much as protection to the metal layer. In the effective area, the thickness of the over coating layer is controlled to have high reflectivity along with the protection of the metal layer. And in the non-effective area, the over coating and the sub coating are combined together since there is no metal layer. The total thickness of the sub coating and the over coating is controlled to have anti-reflective property.

Also the coating layer and the micromirror structure can be etched together. After depositing the micromirror structure together with dummy structures in the non-effective area, the sub coating layer is deposited. Next the metal layer is deposited with patterning the shape of micromirrors. The over coating layer is followed by the metal layer to encapsulate the metal layer with the sub coating layer. After all the layers are deposited, the layers are patterned and etched. The etching processes can be performed altogether with the same patterning process, which reduces the process of the fabrication considerably.

Also with the structure of the present invention, an optical micromirror device can be built with the same advantages of the micromirror array device explained the above. The optical micromirror device the present invention comprises a micromirror. The micromirror comprises a substrate with at least one electrode and at least one actuation element, a micromirror structure, a sub coating layer, a metal layer, and an over coating layer. By changing the motion of the micromirror, the optical micromirror device can change its reflection direction, optical axis, and optical properties of the incident light.

The substrate has at least one electrode to provide actuation force for micromirror motion. The actuation elements make micromirror motion controlled by electrostatic force induced between the electrodes in the substrate and the micromirror structure. The micromirror structure has rotational and/or translational motions controlled by the actuation elements. The sub coating and the over coating layer encapsulate the metal layer to prevent the metal layer from oxidation and to prevent the micromirror structure and the actuation elements from galvanic corrosion. The metal layer makes the micromirror structure have high reflectivity. The encapsulation of the metal layer considerably reduces degradation of reflectivity by the metal layer. The sub coating and the over coating layer provide good protective layers for the metal layer.

The shape of the micromirror can be varied with object of the optical micromirror device. The micromirror has a shape selected from the group consisting of fan, rectangular, square, hexagonal, and triangular shapes. The selection of the micromirror shapes i highly dependent on the optical system geometry and the device itself.

The substrate has at least one electrode, usually a plurality of electrodes for providing actuation force for micromirror motion. Each electrode is used for generating motion for the micromirror. Sometimes groups of electrodes are used for micromirror motion. For controlling the micromirror, a control circuitry should be constructed. The substrate comprises a control circuitry constructed by using semiconductor microelectronics technologies such as MOS and CMOS technologies. By providing semiconductor microelectronics, the control of the optical micromirror device becomes much easier.

To build electrostatic force between the electrodes and the actuation elements or micromirror structure, the electrodes should have a different electric potential from the electric potential of the actuation elements or the micromirror structure. To prevent from possible electric contact between the structures and elements, the electrodes are protected by passivation layer. The passivation layer prevents the electrodes from possible electric contact or problems with other structures in the micromirror structure. The passivation layer can be built with silicon oxide or low-stressed silicon nitride (LSN) since they have high electrical resistance and easy accessibility for fabrication.

The sub coating and the over coating layer encapsulate the metal layer to prevent the metal layer from oxidation and to prevent the micromirror structure and the actuation elements from galvanic corrosion. The encapsulated metal layer is protected by the sub coating and the over coating from degradation of reflectivity and also from acid, base, or severe environments. The sub coating layer is deposited on the micromirror structure with material selected from the group consisting of silicon oxide ($SiO_2$), aluminum oxide ($Al_2O_3$), magnesium oxide (MgO), titanium oxide ($TiO_2$), cesium oxide ($CeO_2$), silicon nitride ($Si_3N_4$), titanium nitride (TiN), magnesium fluoride ($MgF_2$), zinc sulfide (ZnS), zinc selenide (ZnSe), polycarbonate, polyester, polyethylene naphthalate, and fluoropolymer.

To prevent the micromirror structure and the actuation elements from galvanic corrosion, the sub coating layer prevents the metal layer from electrical contacting with micromirror structure. Since the galvanic corrosion can only occur if the dissimilar metals are in electrical contact. When the dissimilar metals are insulated from each other by suitable plastic strips, washers or sleeves, the galvanic corrosion cannot occur. Thus the sub coating layer prevents the micromirror structure and the actuation elements from galvanic corrosion by electrically separating the micromirror structure and the metal layer. For the optical micromirror device with electrostatic force actuation, the electrical separation is especially important. The sub coating material should be highly electrically insulating and also consistent with the fabrication processes. To have sufficient electrical separation and optical properties, the thickness of the sub coating layer should be controlled to have between 20 nm and 500 nm preferably 100 nm.

The metal layer is made of material selected from the group consisting of silver (Ag), aluminum (Al), gold (Ag), nickel (Ni), chromium (Cr), and platinum (Pt) for the micromirror structure to have high reflectivity. The thickness of the metal layer is controlled to have between 20 nm and 1000 nm preferably 100 nm. The thickness should be controlled to have high reflectivity of the micromirror device. Also the material of the metal layer should be selected by considering the required reflectivity, operating wavelength, operating environment, and others. Also since the metal layer is easy to be attacked from acid or base or other environmental reasons, the metal layer should be protected from them. In the present invention, the sub coating and the over coating provide a strong protection for the metal layer from oxidation, acid, base and galvanic corrosion by encapsulating the metal layer. The over coating layer and the sub coating layer prevent the metal layer from oxidation by encapsulating the metal layer. The over coating layer and the sub coating layer protect the metal layer from acid or base to maintain reflectivity of the micromirrors by encapsulating the metal layer. The degradation of the reflectivity is considerable reduced by encapsulation of the metal layer by the sub coating layer and the over coating layer. One more thing is that the over coating layer and the sub coating layer protect the metal layer from etchants while removing sacrificial layer or layers of the micro-mechanical structure. Usually while removing sacrificial layer or layers, a strong acid or base such as fluoric acid is applied to dissolve the sacrificial layers made of such as silicon oxide.

The over coating layer provides a protection for metal layer from the operating environments. Since the metal layer should have high reflectivity, the thickness of the over coating layer should be controlled to maximize reflectivity of the metal layer. The maximized reflectivity enhances the performance of the optical micromirror device. The thickness of the over coating layer is controlled to have between 20 nm and 500 nm preferably 100 nm. Since the over coating layer is directly exposed to the operating environment, the thickness of the over coating layer is more important than that of the sub coating layer, especially to control the reflectivity of the micromirror.

The sub coating layer is deposited on the micromirror structure with material selected from the group consisting of silicon oxide ($SiO_2$), aluminum oxide ($Al_2O_3$), magnesium oxide (MgO), titanium oxide ($TiO_2$), cesium oxide ($CeO_2$), silicon nitride ($Si_3N_4$), titanium nitride (TiN), magnesium fluoride (MgF$_2$), zinc sulfide (ZnS), zinc selenide (ZnSe), polycarbonate, polyester, polyethylene naphthalate, and fluoropolymer.

The optical micromirror device further comprises an optically non-effective area which is other than the micromirror itself Since the structure in the non-effective area does not need actuation parts, the structure of the non-effective area is somewhat different from that of the micromirror. The non-effective area comprises a substrate, at least one dummy structure, a sub coating layer, and an over coating layer. The sub coating and the over coating layers are fabricated together with the layers in the micromirror.

Since the optical micromirror device is a fragile one, the micromirror should be protected during the fabrication and the usage. To protect the micromirror, the dummy structures are introduced and fabricated with the micromirror structures. The dummy structures protect the micromirror from external perturbation. The external perturbation can be occurred during fabrication of the micromirror device and operation of the micromirror device. The dummy structures enclose the micromirror and act as a buffer area of the micromirror device. The dummy structures are also fabricated with the micromirror structures or elements in the micromirror itself.

To enhance the optical performance of the optical micromirror device, the non-effective area should not be optically active. The anti-reflective coating enhances the optical performance of the optical micromirror device. Since the dummy structures do not have metal layer, the structures do not have high reflectivity, but still the dummy structures make effects on the optical quality. To enhance the optical performance, it is highly desired that the non-effective area has as low reflectivity as possible. An anti-reflective coating for the non-effective area is one solution. By controlling the thickness of the exist layers for the micromirror, the non-effective area can have anti-reflective coating. In the non-effective area, two layers of sub coating and over coating layers are applied to the dummy structures. The total thickness of the sub coating and over coating layers can be controlled to have anti-reflective coating properties. To provide anti-reflective coating for non-effective area along with protection of the metal layer is the one of main ideas and advantages of the present invention.

In the present invention, the method for fabricating the optical micromirror device is also provided. The method for fabricating the optical micromirror device comprises the steps of forming electrodes and control circuitry on a substrate, building micromirror actuation elements with sacrificial layer or layers, applying a micromirror structure layer, applying a sub coating layer to the micromirror structure, applying a metal layer to the sub coating layer on effective area, applying an over coating layer, selectively etching the sub coating layer, the over coating layer and the micromirror structure layer to make micromirror structures with coating layers, removing the sacrificial layers and releasing the actuation elements and the micromirror structures just like the method for fabricating the micromirror. The metal layer is encapsulated by the sub coating layer and the over coating layer to prevent the metal layer from oxidation and to prevent the micromirror structures and the actuation elements from galvanic corrosion. Also non-effective area can be made without extra process of fabrication. The only differences are that the non-effective area does not have metal layer since it does not need high reflectivity and that the non-effective area does not have actuation elements. The dummy structures in the non-effective area are more likely the micromirror structure without actuation part. There are lots of advantages for the method of the present invention. By applying the sub coating layer and the over coating layer, the metal layer can be protected from severe environments, oxidation, degradation of reflectivity, acid, base, and galvanic corrosion.

The sub coating and the over coating can provide optical properties to the effective and non-effective area as much as protection to the metal layer. In the effective area, the thickness of the over coating layer is controlled to have high reflectivity along with the protection of the metal layer. And in the non-effective area, the over coating and the sub coating are combined together since there is no metal layer. The total thickness of the sub coating and the over coating is controlled to have anti-reflective property.

Also the coating layer and the micromirror structure can be etched together. After depositing the micromirror structure together with the dummy structures in the non-effective area, the sub coating layer is deposited. Next the metal layer is deposited with patterning the shape of micromirror. The over coating layer is followed by the metal layer to encapsulate the metal layer with the sub coating layer. After all the layers are deposited, the layers are patterned and etched. The etching processes can be performed altogether with the same patterning process, which reduces the process of the fabrication considerably.

The optical micromirror device and the micromirror array device of the present invention has advantages: (1) the high reflective metal layer is protected from oxidation; (2) the reflective metal layer is protected from acid or base; (3) the degradation of the reflective metal layer is reduced; (4) the micro-mechanical structures are protected from galvanic corrosion; (5) the metal layer can have high reflectivity with protection; (6) the non-effective area has anti-reflective coating to enhance optical performance; (7) anti-reflection and protection coating are deposited altogether; (8) the coating layers and the micromirror structure can be etched together; (9) the process of fabrication is simple.

Although the present invention is briefly summarized, the full understanding of the invention can be obtained by the following drawings, detailed description, and appended claims.

BRIEF DESCRIPTION OF THE FIGURES

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
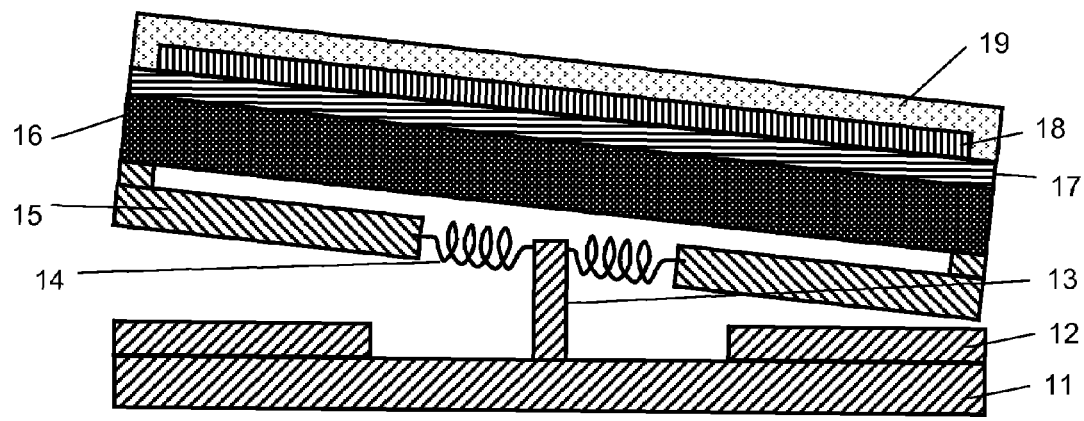
FIG. 1 shows structure of a micromirror in a micromirror array device with sub coating and over coating layers altogether with the metal layer.

FIG. 1 shows the structure of a micromirror with sub coating 17 and over coating 19 layers altogether with the metal layer 18. The substrate 11 has at least one electrode 12 to build electrostatic force between the substrate 11 and the micromirror structure 16. To control the micromirror motion, the corresponding electrode 12 for motion has an electric potential different from the electric potential of the micromirror structure 16. The electrically charged structure makes the capacitive force between the electrodes 12 and the micromirror structure 16. To make micromirror motion, some structures work together and make actuation force to the micromirror. The pillar structure 13 gives a rigid rotational or translational center to the micromirror structure 16. The flexible spring structure 14 connects the rigid bodies and the moving structures. The top electrode 15 gives enhancement on the electrostatic force and on the structural stability. The pillar structure 13, the flexible spring structure 14, the top electrode 15, and other components for actuation can be actuation components. The micromirror structure 16 is built for the base of the micromirror motion and the reflective surface of the micromirror device. On top of the micromirror structure 16, the sub coating layer 17 is applied to build insulation between the micromirror structure 16 and the metal layer 18. The metal layer 18 lies on top of the sub coating layer 17 and gives high reflectivity to the micromirror structure 16. The micromirror structure 16 with high reflectivity plays a role of a high reflector, thus the micromirror array plays a role of a spatial light modulator. And then finally the over coating layer 19 is applied. The over coating 19 is applied to encapsulate the metal layer 18 with the sub coating layer 17 and to prevent the exposure of the metal layer 18 direct to the operational environment, oxidation, acid, base, or galvanic corrosion.

The sub coating 17 and the over coating layer 19 encapsulate the metal layer 18 to prevent the metal layer 18 from oxidation and degradation of the high reflectivity and also to prevent the micromirror structure 16 and the actuation elements 13, 14, 15 from galvanic corrosion. The encapsulated metal layer 18 is protected by the sub coating 17 and the over coating 19. The sub coating layer 17 and the over coating layer 19 is deposited on the micromirror structure 16 with material selected from the group consisting of silicon oxide ($SiO_2$), aluminum oxide ($Al_2O_3$), magnesium oxide (MgO), titanium oxide ($TiO_2$), cesium oxide ($CeO_2$), silicon nitride ($Si_3N_4$), titanium nitride (TiN), magnesium fluoride ($MgF_2$), zinc sulfide (ZnS), zinc selenide (ZnSe), polycarbonate, polyester, polyethylene naphthalate, and fluoropolymer.

To prevent the micromirror structure 16 and the actuation elements 13, 14, 15 from galvanic corrosion, the sub coating layer 17 prevents the metal layer 18 from electrical contacting with micromirror structure 16. Since the galvanic corrosion can only occur if the dissimilar metals are in electrical contact. Here in the present invention of the micromirror array device, the micromirror structure 16 and the metal layer 18 are the dissimilar metals for possible galvanic corrosion. If the dissimilar metals are insulated from each other by suitable plastic strips, washers or sleeves then galvanic corrosion cannot occur. Thus the sub coating layer 17 prevents the micromirror structure 16 and the actuation elements 13, 14, 15 from galvanic corrosion by electrically separating the micromirror structure 16 and the metal layer 18. The sub coating 17 materials should be highly electrically insulating and also consistent with the fabrication processes. While selecting the material for the coatings 17, 19, these requirements should be considered.

To have sufficient electrical separation and optical properties, the thickness of the sub coating layer 17 should be controlled to have between 20 nm and 500 nm preferably 100 nm. The over coating layer 19 provides a protection for metal layer 18 from the operating environments. Since the metal layer 18 should have high reflectivity, the thickness of the over coating layer 19 should be controlled to maximize reflectivity of the metal layer 18. The maximized reflectivity enhances the efficiency of the micromirror array device. The thickness of the over coating layer 19 is controlled to have between 20 nm and 500 nm preferably 100 nm. Since the over coating layer 19 is directly exposed to the operating environment, the thickness of the over coating layer 19 is more important than that of the sub coating layer 17, especially to have high reflectivity of the micromirrors.

The metal layer 18 is made of material selected from the group consisting of silver (Ag), aluminum (Al), gold (Ag), nickel (Ni), chromium (Cr), and platinum (Pt) to have high reflectivity. The thickness of the metal layer 18 is controlled to have between 20 nm and 1000 nm preferably 100 nm. The thickness should be selected to have high reflectivity of the micromirrors. Also the material of the metal layer 18 should be selected by considering the required reflectivity, operating wavelength, operating environment and others. Also since the metal layer 18 is easy to be attacked from acid or base or other environmental reasons, the metal layer 18 should be protected. In the present invention, the sub coating 17 and the over coating 19 provide a strong protection for the metal layer 18 from oxidation, acid, base and galvanic corrosion. The over coating layer 19 and the sub coating layer 17 prevent the metal layer 18 from oxidation by encapsulating the metal layer 18. The over coating layer 19 and the sub coating layer 17 protect the metal layer 18 from acid or base to maintain reflectivity of the micromirror by encapsulating the metal layer 18. One more thing is that the over coating layer 19 and the sub coating layer 17 protect the metal layer 18 from etchants while removing sacrificial layers. Usually while removing sacrificial layer, a strong acid or base such as fluoric acid is applied to dissolve the sacrificial layer such as silicon oxide.

Figure 2:
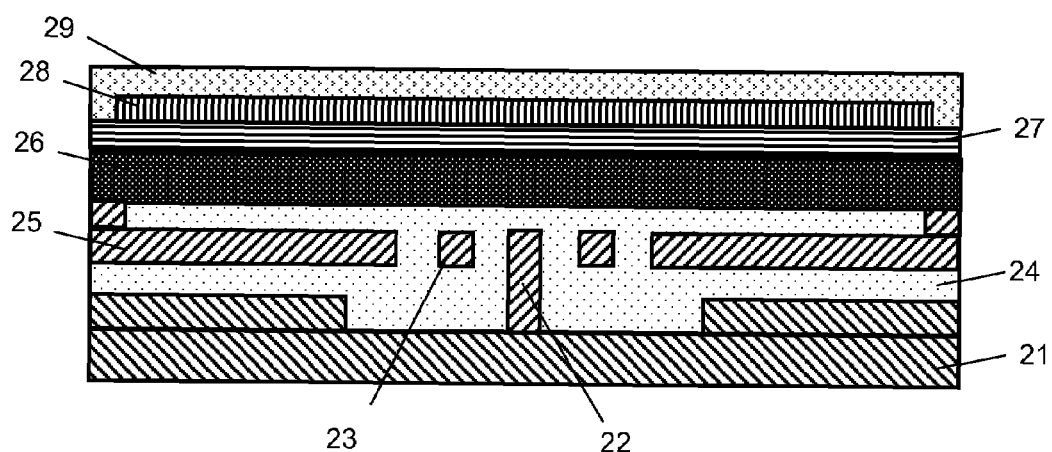
FIG. 2 shows structure of a micromirror in a micromirror array device before removing the sacrificial layers.

FIG. 2 shows the structure of a micromirror in the micromirror array device before removing the sacrificial layers 24. From the substrate 21, the micromirror in the micromirror array device is fabricated with layer by layer. The electrical circuitry and the electrodes for micromirror motion generation are laid on top of the substrate 21. And then the actuation elements 22, 23, 25 are fabricated on the substrate 21 with electrodes. The actuation elements are the pillar structure 22, the flexible spring structure 23, the top electrode 25, and etc. The actuation elements 22, 23, 25 are built with the sacrificial layer 24 to make the structure become layer by layer flat. Then the micromirror structure 26 is made with connection to the actuation elements 22, 23, 25. And then the micromirror structure 26 has a high reflectivity by depositing the metal layer 28. This metal layer 28 is encapsulated and protected by the sub coating layer 27 and the over coating layer 29 while releasing process for removing the sacrificial layer 24 and while the operation of the micromirror array device. Since the metal layer 28 is extremely reactive in some cases, the layer should be protected from oxidation, degradation, acid, and base. This sub coating 27 and over coating layers 29 enhance the durability of the optical coating made by the metal layer 28, thus the micromirror array device.

The substrate 21 has at least one electrode, usually a plurality of electrodes for providing actuation force for micromirror motion. Each electrode is used for generating motion for micromirror. Sometimes groups of electrodes are used for micromirror motion. The electrical circuitry in the substrate 21 gives the controllability of the micromirror device. When the micromirror device becomes a micromirror array device or a Micromirror Array Lens, the control circuitry becomes more complex. In a Micromirror Array Lens, the electrical control circuitry has its controllability of each micromirror. For controlling the micromirrors in the micromirror array device, a control circuitry should be constructed. The substrate 21 comprises a control circuitry constructed by using semiconductor microelectronics technologies such as MOS and CMOS technologies. By providing semiconductor microelectronics, the micromirror array device can have high flexibility in motion generation with easy control.

To build electrostatic force between the electrodes and the actuation elements 22, 23, 25 or micromirror structure 26, the electrodes should have a different electric potential from the electric potential of the actuation elements 22, 23, 25 or micromirror structure 26. To prevent from the possible electric contact between the structures and elements, the electrodes are protected by passivation layer (not shown in the figure). The passivation layer prevents the electrodes from possible electric contact with other structures 22, 23, 25, 26 in the micromirror. Passivation layer can be built with silicon oxide or low-stressed silicon nitride since they have high electrical resistance.

Building a control circuitry and controlling the micromirror array is especially important when the application is being built. The Micromirror Array Lens is a good example of the micromirror array applications. To build a micromirror array as a Micromirror Array Lens, the micromirror array should satisfy two conditions to form a good lens. One is the convergence condition that every light should be converged into a focal point. The other is the phase matching condition that the phase of the converged light should be the same. In a conventional lens, the phase matching condition is that all the light passing through a lens should have the same optical path length to the focal point. But the Micromirror Array Lens arranged in a flat surface uses the periodicity of the light to satisfy the phase matching condition. Since the same phase condition occurs periodically, the phase matching condition can be satisfied even though the optical path length is different. Each micromirror in the Micromirror Array lens can be controlled independently to satisfy the phase matching condition and the convergence condition.

Only after satisfying the convergence and the phase matching conditions, the Micromirror Array Lens can build a lens with an optical surface profile. An optical surface profile is the surface shape of the micromirror array which meets the lens conditions of convergence and phase matching. Each micromirror in the effective area is independently controlled to form at least an optical surface profile. The Micromirror Array Lens has a plurality of optical surface profiles to have a variable focusing property. By changing the optical surface profile, the Micromirror Array Lens can change its focal length, optical axis, and focusing properties. The Micromirror Array Lens can be a variable focusing lens having lots of optical profiles.

To have simplicity in control circuitry, the Micromirror Array Lens can be built so that the micromirrors in the effective area are controlled by a common input signal to the electrodes to form an optical surface profile. With this method, the Micromirror Array Lens can be digitally or discretely controlled to have an optical surface profile with corresponding optical properties. Also the number of the inputs can be reduced by using common input signal down to the number of optical surface profiles. To control a certain amount of the optical surface profiles, only the same number of the electrical inputs is needed. Also the operating circuitry becomes extremely simple. The motion of the Micromirror Array Lens is activated by applying voltages to the corresponding electrodes through the control circuitry. The motion can be made only after the releasing process by removing the sacrificial layer or structures in the micromirror array device.

FIGS. 3A-3I shows the fabrication process of micromirror device with effective area 39A and non-effective area 39B. The method for fabricating the micromirror array device comprises the steps of forming electrodes 31A, 31B and control circuitry on a substrate 31C, building micromirror actuation elements 32A, 32B, 32C, 32D, 32E with sacrificial layer or layers 37, applying a micromirror structure layer 33C, applying a sub coating layer 34C to the micromirror structure layer 33C, applying a metal layer 35 to the sub coating layer 34C on effective area 39A, applying an over coating layer 36C, selectively etching the sub coating layer 34C, the over coating layer 36C and the micromirror structure layer 33C to make micromirror structures 33A, 33B with coating layers 34A, 34B, 36A, 36B, removing the sacrificial layers 37 and releasing the actuation elements 32A, 32B, 32C, 32D, 32E and the micromirror structures 33A, 33B. The metal layer 35 is encapsulated by the sub coating layer 34A and the over coating layer 36A to prevent the metal layer 35 from oxidation and to prevent the micromirror structures 33A, 33B and the actuation elements 32A, 32B, 32C, 32D, 32E from galvanic corrosion. Non-effective area 39B can be made without extra process of fabrication. The differences from the effective area 39A are that the non-effective area 39B does not have metal layer 35 since it does not need high reflectivity and that the non-effective area 39B does not have actuation elements 32A, 32C, 32D, 32E. The dummy structures 33B are more likely the micromirror structures 33A without actuation part. There are lots of advantages for the method of the present invention. By applying sub coating layer 34A and over coating layer 36A, the metal layer 35 can be protected from severe environments, oxidation, degradation, acid, base, and galvanic corrosion.

The sub coating 34A, 34B and the over coating 36A, 36B can provide optical properties to the effective area 39A and non-effective area 39B as much as protection to the metal layer 35. In the effective area 39A, the thickness of the over coating layer 36A is controlled to have high reflectivity along with the protection of the metal layer 35. And in the non-effective area 39B, the over coating 36B and the sub coating 34B are combined together since there is no metal layer. The total thickness of the sub coating 34B and the over coating 36B can be controlled to have anti-reflective property of the micromirror array device in the non-effective area 39B.

Also the coating layer 34C, 36C and the micromirror structure 33C can be etched together. After depositing the micromirror structure layer 33C including micromirror structure 33A in the effective area 39A together with the dummy structures 33B in the non-effective area 39B, the sub coating layer 34C is deposited. Next the metal layer 35 is deposited with patterning with the shape of micromirrors. The over coating layer 36C is followed by the metal layer 35 to encapsulate the metal layer 35 with the sub coating layer 34C. After all the layers 33C, 34C, 35, 36C are deposited, the layers 33C, 34C, 36C are patterned and etched. The etching processes can be performed altogether with the same patterning process, which reduces the process of the fabrication considerably.

Figure 3A:
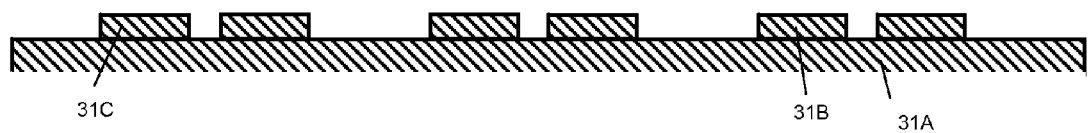
FIGS. 3A-3I shows fabrication process of the micromirror array device with effective and non-effective area.

FIG. 3A shows the first step of building the micromirror array device, which is making the electrodes 31A, 31B on the substrates 31C. The substrate 31C has at least one electrode 31A, 31B usually a plurality of electrodes 31A, 31B for providing actuation force for micromirror motion. Each electrode 31A is used for generating motion for micromirror. Sometimes groups of electrodes 31A are used for micromirror motion. For controlling the micromirror, a control circuitry should be constructed. The substrate 31C comprises a control circuitry constructed by using semiconductor microelectronics technologies such as MOS and CMOS technologies. By providing semiconductor microelectronics, the micromirror array device can have high flexibility in motion with easy control.

Figure 3B:
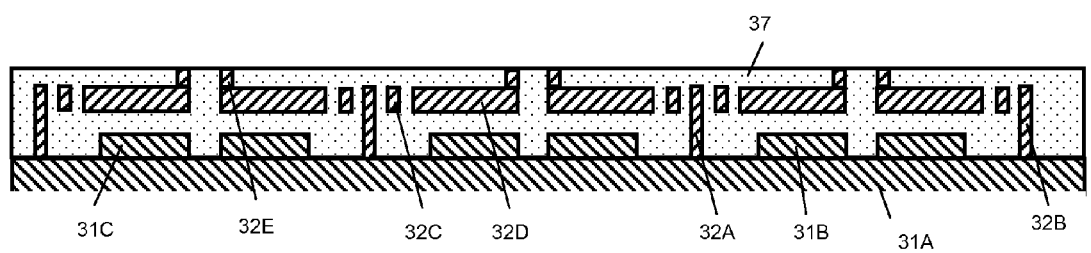

In FIG. 3B, the fabrication of the actuation elements 32A, 32B, 32C, 32D, 32E with sacrificial layers 37 are illustrated. To build electrostatic force between the electrodes 31A and the actuation elements 32A, 32B, 32C, 32D, 32E, or micromirror structure 33A, the electrodes 31A should have a different electric potential from the actuation elements 32A, 32B, 32C, 32D, 32E or micromirror structure 33A. To prevent from the possible electric contact between the structures and elements 32A, 32B, 32C, 32D, 32E, 33A the electrodes 31A, 31B are protected by passivation layer (not shown in the figure). The passivation layer prevents the electrodes 31A, 31B from possible electric contact with other structures in the micromirror array device. Passivation layer can be built with silicon oxide or low-stressed silicon nitride since they have high electrical resistance.

After building the electrodes 31A, 31B with control circuitry on the substrate 31C, the actuation elements 32A, 32B, 32C, 32D, 32E are built with sacrificial layer 37. To make micromirror motion, some structures work together and make actuation force to the micromirror. The pillar structure 32A, 32B gives a rigid rotational or translational center to the micromirror structures 33A. The flexible spring structure 32C connects the rigid bodies and the moving structures and also the restoration force to the system. The top electrode 32D gives enhancement on the electrostatic force and on the structural stability. The top electrode 32D and the micromirror structure 33A are connected by the post structure 32E. Since there should be space for the moving structures and elements 32A, 32B, 32C, 32D, 32E, 33A, the structure are fabricated with sacrificial layer 37, which will be removed after fabrication process before operating the device.

Figure 3C:
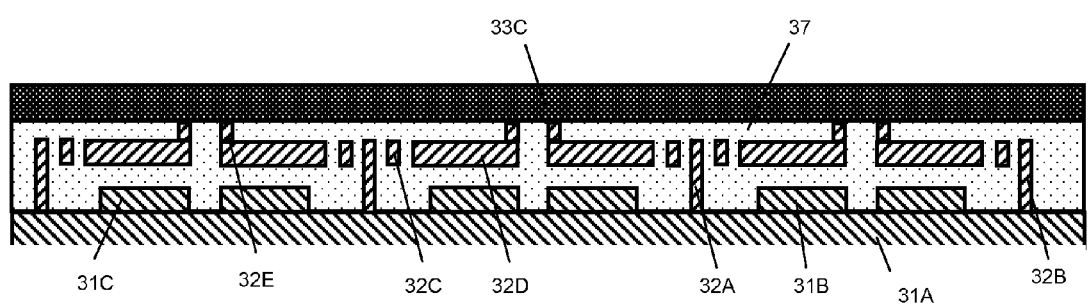

Actuation elements 32A, 32B, 32C, 32D, 32E are followed by micromirror structure layer 33C including the micromirror structure 33A and the dummy structures 33B. The process for building the micromirror structure layer 33C is shown in FIG. 3C. Especially the micromirror structure 33A should be the base structure for the optical reflectivity. The structure can be planarized by applying chemical mechanical polishing process (CMP). The CMP process can be applied to the over-grown sacrificial layer 37 before depositing the micromirror structure 33A or can be applied to the micromirror structure 33A after depositing the micromirror structure 33A to have flat surface micromirrors for the reflection. While the CMP process, it is desirable to have the mechanical structures to be protected by other structure 33B from the external shock or force. To protect the micromirror structure 33A during the CMP process and other processes, the present invention introduces the dummy structures 33B in the optically non-effective area 39B. The dummy structures 33B are located in the optically non-effective area 39B and do not have actuation elements. The dummy structures 33B are rather fixed structures than structures with free moving. The dummy structures 33B in the non-effective area 39B are fixed and protect the micromirrors in the effective area 39A from external perturbation. The external perturbation can be occurred during fabrication of the micromirror array device and operation of the micromirror array device.

The micromirror array device in the present invention comprises optically non-effective area 39B which is other than the controlled micromirror area 39A. Since the structure 33B in the non-effective area 39B does not need actuation parts, the structure 33B of the non-effective area 39B is somewhat different from that 33A of effective area 39A. The structure 33B in the optically non-effective area 39B mainly protects the micromirrors 33A in the effective area 39A. Since the micromirror array device is a fragile device, the micromirrors 33A in the effective area 39A should be protected during the fabrication and the usage. The dummy structures 33B protect the micromirrors 33A in the effective area 39A. The dummy structures 33B encircle the effective area 39A and act as a buffer area of the device. The dummy structures 33B are also fabricated with the micromirror structures 33A or elements 32C, 32D, 32E in the effective area 39A.

Until now the micromirror structure 33A and the dummy structure 33B are not separated and the only difference between them is the presence of the actuation elements 32C, 32D, 32E. Since the dummy structures 33B do not need to move, the dummy structures 33B do not have movable actuation structure. The dummy structures 33B rather have the fixed rigid structures to have rigidity than movable structures. Also the structure 33B is not distinguished until the etching process of the micromirror gap 38 between the micromirror structures 33A and the dummy structures 33B.

Figure 3D:
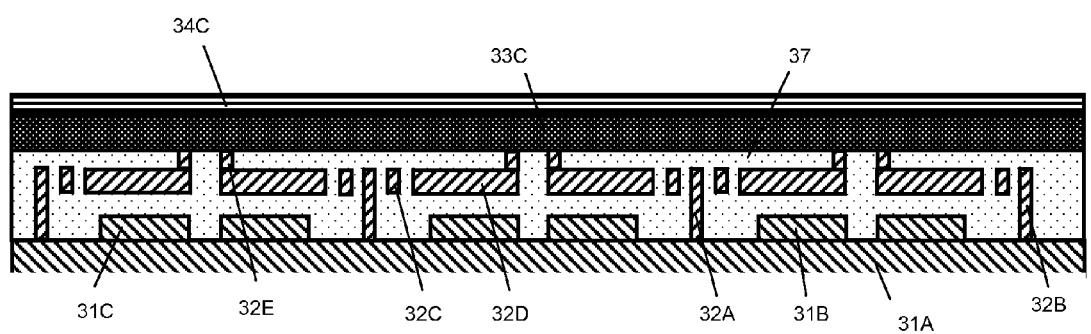

After depositing the micromirror structure layer 33C, the sub coating layer 34C is applied. The process is shown in FIG. 3D. Since the sub coating layer 34C can also be etched together with over coating layer 36C and the micromirror structure layer 33C, the layer 34C does not has any pattern until now, either.

The sub coating 34A encapsulate the metal layer 35 to prevent the metal layer 35 from oxidation and to prevent the micromirror structure 33A and the actuation elements 32B, 32C, 32D, 32E from galvanic corrosion with the over coating 36A. The sub coating layer 34C is deposited on the micromirror structure layer 33C with material selected from the group consisting of silicon oxide ($SiO_2$), aluminum oxide ($Al_2O_3$), magnesium oxide (MgO), titanium oxide ($TiO_2$), cesium oxide ($CeO_2$), silicon nitride ($Si_3N_4$), titanium nitride (TiN), magnesium fluoride ($MgF_2$), zinc sulfide (ZnS), zinc selenide (ZnSe), polycarbonate, polyester, polyethylene naphthalate, and fluoropolymer.

To prevent the micromirror structure 33A and the actuation elements 32B, 32C, 32D, 32E from galvanic corrosion, the sub coating layer 34A prevents the metal layer 35 from electrical contacting with micromirror structure 33A. Since the galvanic corrosion can only occur if the dissimilar metals are in electrical contact. Here in the Micromirror Array Lens, the micromirror structure 33A and the metal layer 35 are the dissimilar metals for possible galvanic corrosion. If the dissimilar metals are insulated from each other by suitable plastic strips, washers or sleeves then galvanic corrosion cannot occur. Thus the sub coating layer 34A prevents the micromirror structure 33A and the actuation elements 32B, 32C, 32D, 32E from galvanic corrosion by electrically separating the micromirror structure 33A from the metal layer 35. The sub coating 34A material should be highly electrically insulating and also consistent with the fabrication processes.

To have sufficient electrical separation and optical properties, the thickness of the sub coating layer 34C, 34A should be controlled to have between 20 nm and 500 nm preferably 100 nm. The sub coating layer 34C, 34B is also used for providing anti-reflective coating for the dummy structures 33B in the optically non-effective area 39B. In the non-effective area 39B, the over coating 36B and the sub coating 34B are combined together since there is no metal layer. The total thickness of the sub coating 34B and the over coating 36B can be controlled to have anti-reflective property in the non-effective area 39B. Since the thickness of the over coating layer 36C, 36A should be controlled to have high reflectivity of the metal layer 35, the anti-reflective property should be obtained by controlling the sub coating layer 34C, 34B without providing extra layer structure.

Since the non-effective area 39B should not be optically active, the anti-reflective coating for the non-effective area 39B enhances the performance of the micromirror array device. Since the dummy structures 33B do not have metal layer, the structure 33B does not have high reflectivity. To enhance the optical performance, it is much better that the non-effective area 39B has as low reflectivity as possible. An anti-reflective coating for the non-effective area 39B is one solution. By controlling the thickness of the existing layers 34C, 34C for the micromirror structures 33A, the non-effective area 39B can have anti-reflective coating. In the non-effective area 39B, two layers of sub coating 34B and over coating layers 36B are applied to the dummy structures 33B. The total thickness of the sub coating 34B and over coating 36B layers can be controlled to have anti-reflective coating properties. To provide anti-reflective coating for non-effective area 39B along with protection of the metal layer 35 in optically effective area 39A is the one of main ideas and advantages of the present invention.

Figure 3E:
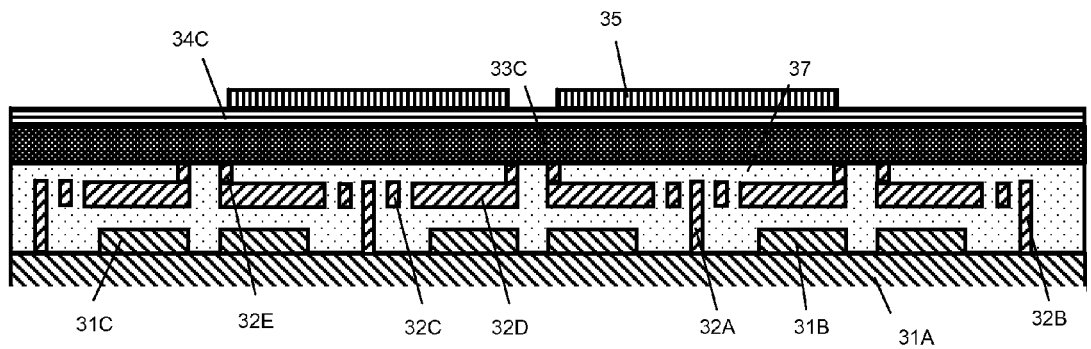

In FIG. 3E, the process with the patterned metal layer 35 is presented. The metal layer 35 is patterned with the mask of the micromirror shapes. Only on top of the movable and optically effective area 39A, the metal layer 35 is applied to have high reflectivity. The well known lift-off process and evaporation or sputtering process with micro lithography can be applied to make the metal layer with micromirror patterning.

The metal layer 35 is made of material selected from the group consisting of silver (Ag), aluminum (Al), gold (Ag), nickel (Ni), chromium (Cr), and platinum (Pt) to have high reflectivity. The thickness of the metal layer is controlled to have between 20 nm and 1000 nm preferably 100 nm. The thickness should be selected to have high reflectivity of the micromirrors. Also the material of the metal layer 35 should be selected by considering the required reflectivity, operating wavelength, operating environment and others. Also since the metal layer 35 is easy to be attacked from acid or base or other environmental reasons, the metal layer 35 should be protected. In the present invention, the sub coating layer 34A and the over coating layer 36A provide a strong protection for the metal layer 35 from oxidation, acid, base and galvanic corrosion. The over coating layer 36A and the sub coating layer 34A prevent the metal layer 35 from oxidation by encapsulating the metal layer 35. The over coating layer 36A and the sub coating 34A layer protect the metal layer 35 from acid or base to maintain reflectivity of the micromirror by encapsulating the metal layer 35. Also the over coating layer 36A and the sub coating 34A layer reduces degradation of reflectivity of the micromirrors provided by the metal layer 35. One more thing is that the over coating layer 36A and the sub coating layer 34A protect the metal layer 35 from etchants while removing sacrificial layers 37. Usually while removing sacrificial layers 37, a strong acid or base such as fluoric acid is applied to dissolve the sacrificial layer such as silicon oxide. The protection from a strong acid and a strong base is another purpose of the present invention.

Figure 3F:
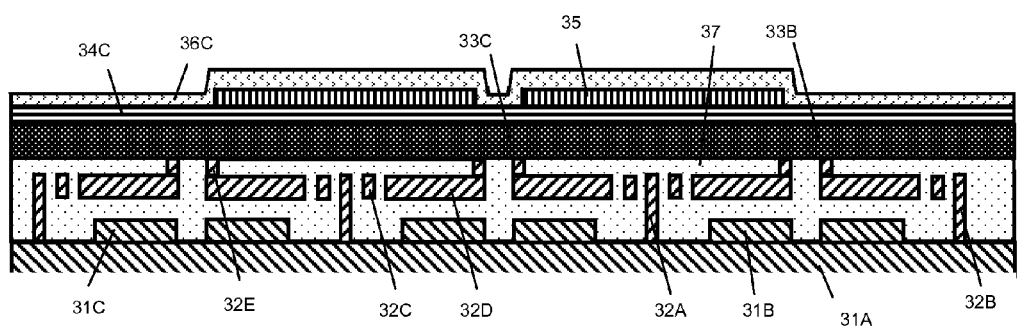

Deposition of the over coating layer 36C is illustrated in FIG. 3F. The over coating layer 36A provides a protection for metal layer 35 from the operating environments. Since the metal layer 35 should have high reflectivity, the thickness of the over coating layer 36A should be controlled to maximize reflectivity of the metal layer 35. The maximized reflectivity enhances the optical performance of the micromirror array device. The thickness of the over coating layer 36A is controlled to have between 20 nm and 500 nm preferably 100 nm. Since the over coating layer 36A is directly exposed to the operating environment, the thickness of the over coating layer 36A is more important than that of the sub coating layer 34A, especially to maximize the reflectivity of the micromirrors.

The sub coating layer 34C is deposited on the micromirror structure 33C with material selected from the group consisting of silicon oxide (SiO$_2$), aluminum oxide (Al$_2$O$_3$), magnesium oxide (MgO), titanium oxide (TiO$_2$), cesium oxide (CeO$_2$), silicon nitride (Si$_3$N$_4$), titanium nitride (TiN), magnesium fluoride (MgF$_2$), zinc sulfide (ZnS), zinc selenide (ZnSe), polycarbonate, polyester, polyethylene naphthalate, and fluoropolymer. The materials for sub coating layer 34C and over coating layer 36C can be the same. The material should be selected considering the operating environments and the solvent to be used.

Figure 3G:
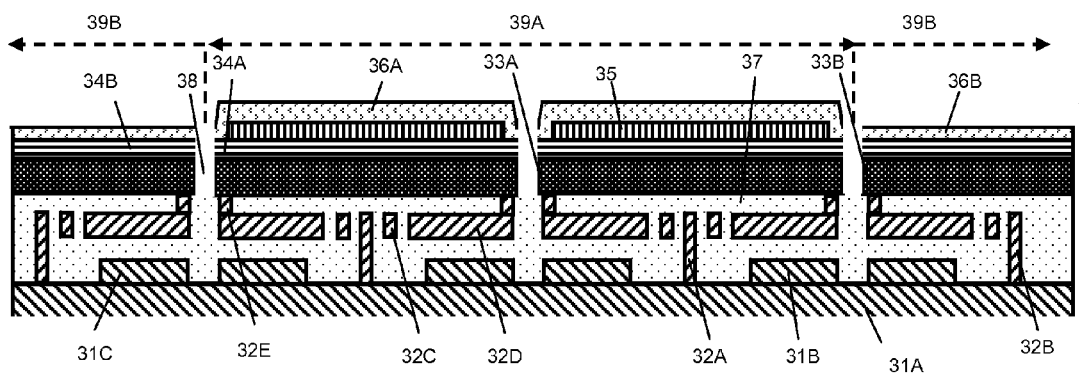

FIG. 3G illustrates the etching process of the micromirror device. The micromirror gap 38 between micromirrors 33A and the dummy structure 33B is etched. The micromirror structure layer 33C now has its own separated structures for micromirrors 33A and dummy structures 33B. The micromirror array device comprises optically non-effective area 39B which is other than the controlled micromirror area 39A. Now the effective area 39A and the non-effective area 39B can be differentiated. Since the structure 33B in the non-effective area 39B does not need actuation parts, the structure 33B of the non-effective area 39B is somewhat different from that 33A of effective area 39A. The non-effective area 39B comprises a substrate 31C, at least one dummy structure 33B, a sub coating layer 34B, and an over coating layer 36B. The sub coating 34B and the over coating layers 36B are fabricated together with the layers 34A, 36A in the micromirrors in the effective area 39A as one layer 34C, and 36C.

Since the micromirror array device is a fragile one, the micromirrors should be protected during the fabrication and the usage. The structures in non-effective area 39B protect the micromirror structures 33A in the effective area 39A. The dummy structures 33B encircle the effective area 39A and act as a buffer area 39B of the device. The dummy structures 33B are also fabricated with the micromirror structures 33A or elements 32C, 32D, 32E in the effective area 39A.

The non-effective area 39B should not be optically active. The anti-reflective coating enhances the performance of the micromirror array device. Since the dummy structures 33B do not have metal layer 35, the structure 33B does not have high reflectivity. To enhance the optical performance, it is much better that the non-effective area 39B has as low reflectivity as possible. An anti-reflective coating for the non-effective area 39B is one solution. By controlling the thickness of the existing layers 34C, 36C for the micromirrors, the non-effective area 39B can have anti-reflective coating. In the non-effective area 39B, two layers of sub coating 34B and over coating 36B layers are applied to the dummy structures 33B. The total thickness of the sub coating 34B and over coating 36B layers can be controlled to have anti-reflective coating properties. To provide anti-reflective coating for non-effective area 39B along with protection of the metal layer 35 is the one of main ideas and advantages of the present invention.

Figure 3H:
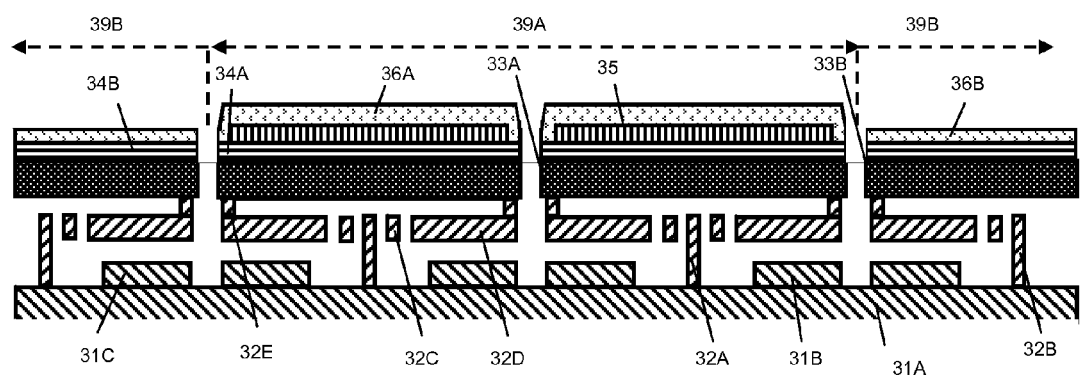

In FIG. 3H, the released structure of the micromirror array device without the sacrificial layer 37 is shown. Since there should be space for the moving structures and elements 32B, 32C, 32D, 32E, the structures for the micromirror array device are fabricated with sacrificial layer 37, which will be removed after fabrication process before operating the device. Usually while removing sacrificial layers 37, a strong acid or base such as fluoric acid is applied to dissolve the sacrificial layers 37 such as silicon oxide. After removing the sacrificial layers 37, the micromirror array device is ready for usage.

Figure 3I:
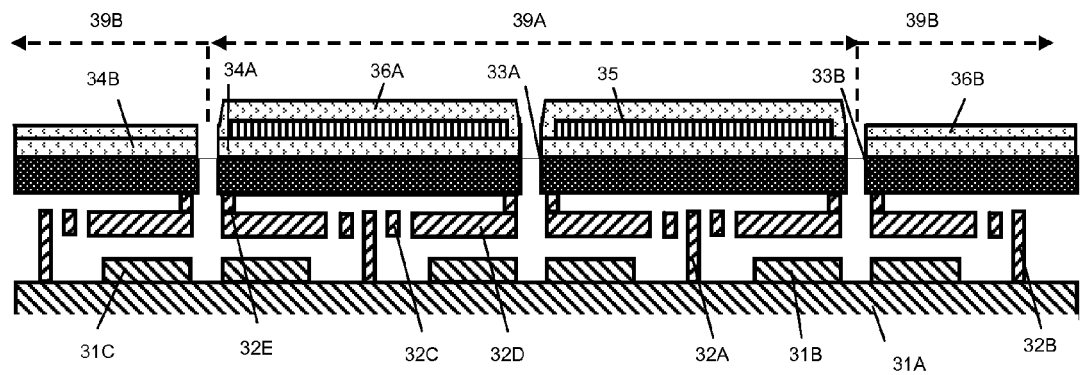

In FIG. 3I, the micromirror array device which has the same material for the sub coating 34A, 34B and the over coating 36A, 36B in the structure. Since the material of the sub coating 34A, 34B and the over coating 36A, 36B is the same. The process for the micromirror array device can made simplified and compact. The thickness of the over coating 36A, 36B layer should be determined by considering the optical reflectivity of the metal layer 35 in the effective area 39A. And the thickness of the sub coating 34A, 34B layer should be determined by considering the anti-reflective property of the dummy structures 33B in the optically non-effective area 39B. By controlling both the thicknesses of the sub coating 34A, 34B layer and the over coating 36A, 36B layer, the protection with high reflectivity for the metal layer 35 and the anti-reflection for the dummy structures 33B can be obtained simultaneously. The present invention has superior advantages of having high reflectivity for the metal layer 35 and the anti-reflection for the dummy structures 33B simultaneously. Also the process does not use extra layer or structure for making the micromirror array device.

Figure 4:
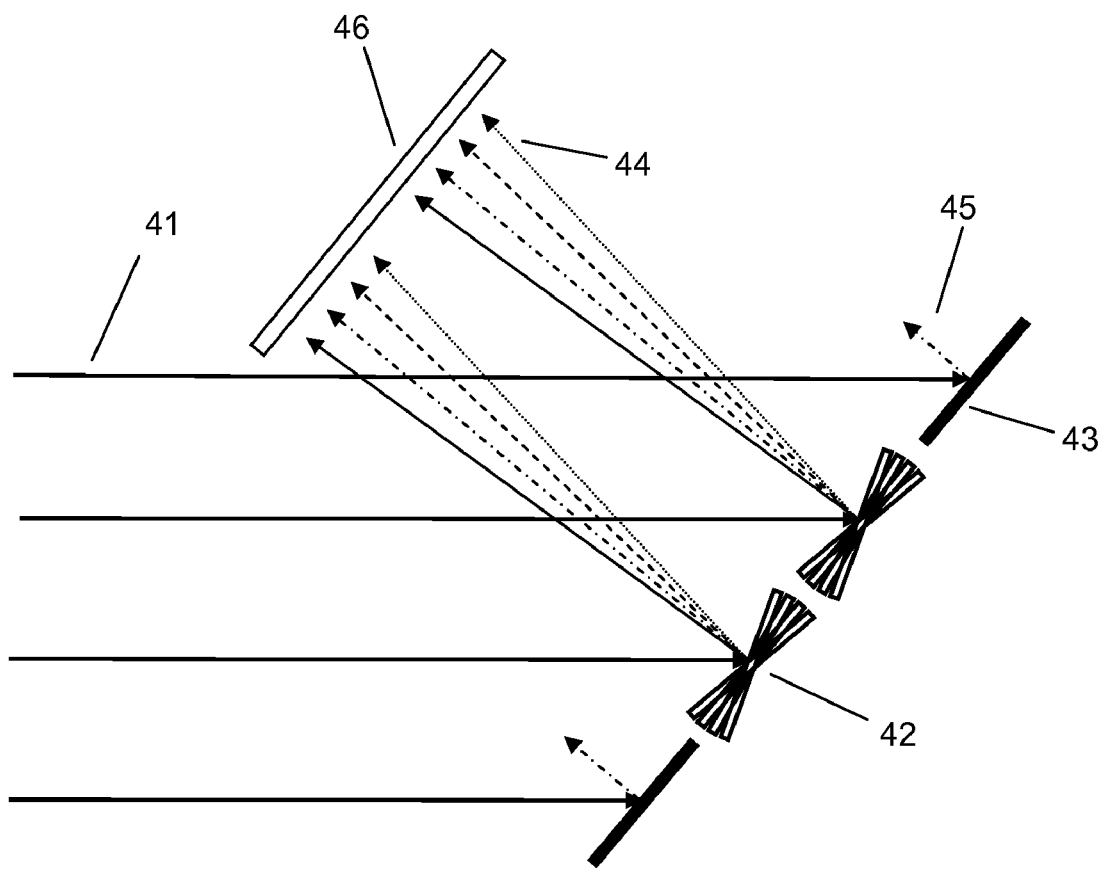
FIG. 4 shows how the light modulation of the micromirror array device and the anti-reflective coating in non-effective area work.

FIG. 4 shows how the light modulation of the micromirror array device and the anti-reflective coating in non-effective area work. The incident light 41 comes from the left and incidents on the micromirrors 42 in the effective area and the dummy structures 43 in the non-effective area. The modulated light 44 are modulated by the micromirror motion in the effective area. The modulated light finally arrives onto the screen 46. Also the light incident on the non-effective area are absorbed or reduced by the anti-reflective coating. The reduced light 45 by the anti-reflective coating on the dummy structures in the non-effective area is aimed out of the screen. The anti-reflective coating reduces the incident light and gives reduced light 45.

The shape of the micromirror can be varied with optical system. The micromirror has a shape selected from the group consisting of fan, rectangular, square, hexagonal, triangular, and circular shapes. For an optical system with an axis-symmetry, the micromirror with rectangular or square shape can be selected. The hexagonal and triangular shape micromirror is also used for systems with the axis-symmetry, especially with three-fold axis symmetry. Circular micromirror can be used for rotational symmetry system. Anyway, the selection of the micromirror shape is highly dependent on the optical system geometry and the device.

Figure 5:
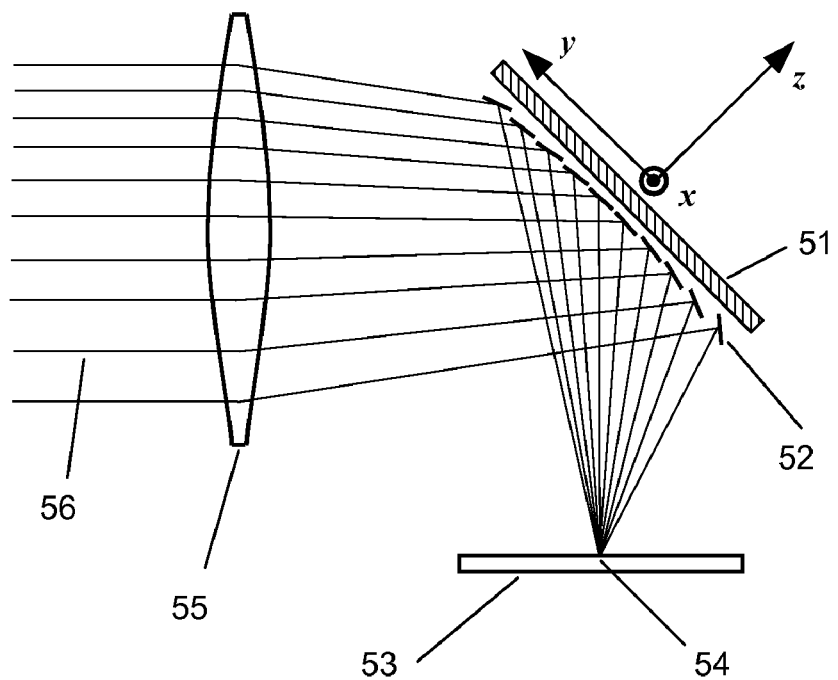
FIG. 5 illustrates an optical system of a Micromirror Array Lens having an axis-symmetry as an example of the micromirror array device.

FIG. 5 shows a Micromirror Array Lens as an example of the micromirror array device. The Micromirror Array Lens has a different geometry depending on applications. The geometry of the example can be used as an automatic focusing system as an application of the Micromirror Array Lens. The incident light 56 comes from the left and passes through an auxiliary lens 55. The auxiliary lens 55 changes optical power of the system. Then the Micromirror Array Lens 51 changes the focal length, optical axis and other focusing properties of the optical system to make images 54 onto the image sensor 53 by controlling each micromirror 52 in the Micromirror Array Lens 51 independently. In this geometry, the Micromirror Array Lens 51 has an axis-symmetry about the y-axis. The coordinate configuration is shown in the figure. Since the system has an axis-symmetry, the shape of the micromirror 52 can be determined by considering the axis-symmetry of the optical system. To have an automatic function, the control process of the Micromirror Array Lens 51 according to the image quality on the image sensor 53 should be added.

The shape of the micromirrors 52 can be varied with geometry of the Micromirror Array Lens 51. The micromirrors 52 in the effective area have a shape selected from the group consisting of fan, rectangular, square, hexagonal, and triangular shapes. For an optical system with an axis-symmetry such as shown in FIG. 5, the micromirrors with rectangular or square shapes can be selected to have a proper geometry of the optical system. The hexagonal and triangular shape micromirrors are also used for systems with the axis-symmetry, especially with three-fold axis symmetry. Hexagonal micromirrors can be used for highly dense system. Anyway, the selection of the micromirror shapes is highly dependent on the optical system geometry and the devices.

Figure 6:
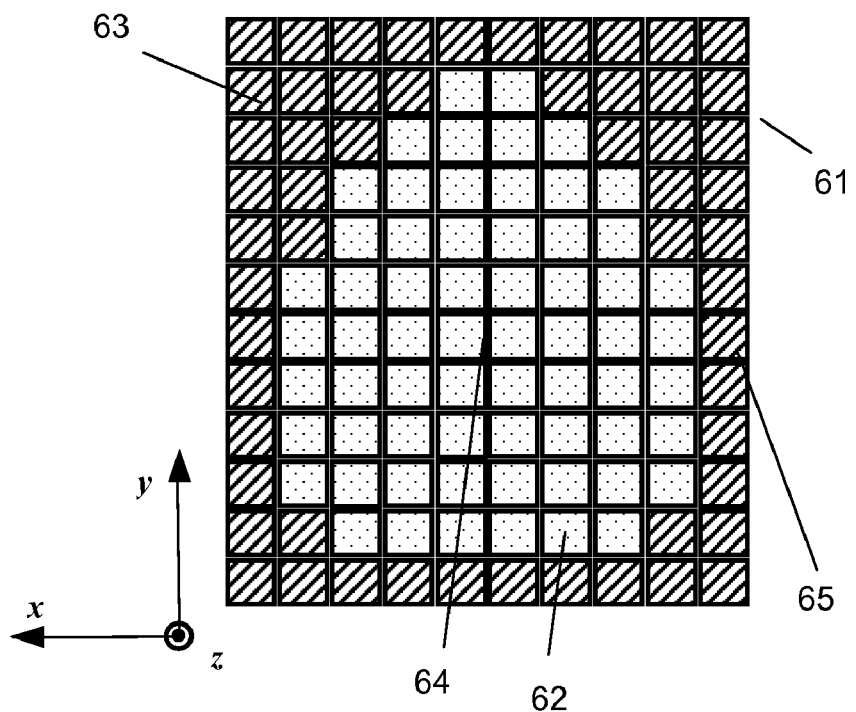
FIG. 6 illustrates effective and non-effective area determined by the optical geometry with an axis-symmetry in a Micromirror Array Lens.

In FIG. 6, a Micromirror Array Lens 61 as an example of the micromirror array device is shown for the axis-symmetry system shown in FIG. 5. The coordinate of the Micromirror Array Lens 61 is the same as the one in FIG. 5. There can be found the optically effective area 64 in the center and also the optically non-effective area 65 can be found around the effective area 64. The non-effective area 65 has a plurality of dummy structures 63 to protect the micromirrors 62 in the effective area 64. And since the optical system has an axis-symmetry about y-axis, the Micromirror Array Lens 61 has also an axis-symmetry about the y-axis. The micromirrors 62 in the optically effective area 64 only make their own motion to build an optical surface profile. The optical surface profile satisfies convergence and phase matching conditions for forming a lens.

To have a function as a Micromirror Array Lens, the micromirror array for the Micromirror Array Lens should satisfy two conditions to form a good lens. One is the convergence condition that every light should be converged into a focal point. The other is the phase matching condition that the phase of the converged light should be the same. In a conventional lens, the phase matching condition is that all the light passing through a lens should have the same optical path length to the focal point. But the Micromirror Array Lens arranged in a flat surface uses the periodicity of the light to satisfy the phase matching condition. Since the same phase condition occurs periodically, the phase matching condition can be satisfied even though the optical path length is different. Each micromirror in the Micromirror Array Lens can be controlled independently to satisfy the phase matching condition and the convergence condition.

Only after satisfying the convergence and the phase matching conditions, the Micromirror Array Lens can build a lens with an optical surface profile. An optical surface profile is the surface shape of the micromirror array which meets the lens conditions of convergence and phase matching. Each micromirror in the effective area is independently controlled to form at least an optical surface profile. The Micromirror Array Lens has a plurality of optical surface profiles to have a variable focusing property. By changing the optical surface profiles, the Micromirror Array Lens can change its focal length, optical axis, and other focusing properties. The Micromirror Array Lens can be a variable focusing lens having lots of optical surface profiles. For having an automatic focusing function, the system can have pre-determined optical surface profiles according to the object distance. The different optical surface profiles are controlled with the signal from the image sensor.

While the invention has been shown and described with reference to different embodiments thereof, it will be appreciated by those skills in the art that variations in form, detail, compositions and operation may be made without departing from the spirit and scope of the present invention as defined by the accompanying claims.

What is claimed is:

1. An optical micromirror device having a micromirror, wherein the micromirror comprising:
    a) a substrate with at least one electrode to provide actuation force for micromirror motion;
    b) at least one actuation element to make micromirror motion controlled by electrostatic force induced by the electrodes in the substrate;
    c) a micromirror structure having rotational and/or translational motions controlled by the actuation elements;
    d) a sub coating layer deposited on the micromirror structure;
    e) an over coating layer; and
    f) a totally encapsulated metal layer by the sub coating layer and the over coating layer to make the micromirror structure have high reflectivity.

2. The optical micromirror device of claim 1, wherein the micromirror has a shape selected from the group consisting of fan, rectangular, square, hexagonal, triangular, and circular shapes.

3. The optical micromirror device of claim 1, wherein the substrate further comprises a control circuitry constructed by using semiconductor microelectronics technologies.

4. The optical micromirror device of claim 1, wherein the electrodes are protected by passivation layer wherein the passivation layer prevents the electrodes from possible electric contact with the actuation elements or the micromirror structure.

5. The optical micromirror device of claim 1, wherein the sub coating layer is deposited on the micromirror structure with material selected from the group consisting of silicon oxide ($SiO_2$), aluminum oxide ($Al_2O_3$), magnesium oxide (MgO), titanium oxide ($TiO_2$), cesium oxide ($CeO_2$), silicon nitride ($Si_3N_4$), titanium nitride (TiN), magnesium fluoride ($MgF_2$), zinc sulfide (ZnS), zinc selenide (ZnSe), polycarbonate, polyester, polyethylene naphthalate, and fluoropolymer.

6. The optical micromirror device of claim 1, wherein the sub coating layer prevents the metal layer from electrical contacting with the micromirror structure.

7. The optical micromirror device of claim 1, wherein the sub coating layer prevents the micromirror structure and the actuation elements from galvanic corrosion by electrically separating the micromirror structure from the metal layer.

8. The optical micromirror device of claim 1, wherein thickness of the sub coating layer is controlled to have between 20 nm and 500 nm.

9. The optical micromirror device of claim 1, wherein the metal layer is made of material selected from the group consisting of silver (Ag), aluminum (Al), gold (Au), nickel (Ni), chromium (Cr), and platinum (Pt) to have high reflectivity.

10. The optical micromirror device of claim 1, wherein thickness of the metal layer is controlled to have between 20 nm and 1000 nm.

11. The optical micromirror device of claim 1, wherein the over coating layer is deposited on the micromirror structure with material selected from the group consisting of silicon oxide ($SiO_2$), aluminum oxide ($Al_2O_3$), magnesium oxide (MgO), titanium oxide ($TiO_2$), cesium oxide ($CeO_2$), silicon nitride ($Si_3N_4$), titanium nitride (TiN), magnesium fluoride ($MgF_2$), zinc sulfide (ZnS), zinc selenide (ZnSe), polycarbonate, polyester, polyethylene naphthalate, and fluoropolymer.

12. The optical micromirror device of claim 1, wherein thickness of the over coating layer is controlled to maximize reflectivity of the metal layer.

13. The optical micromirror device of claim 1, wherein thickness of the over coating layer is controlled to have between 20 nm and 500 nm.

14. The optical micromirror device of claim 1, wherein the over coating layer and the sub coating layer prevent the metal layer from oxidation by encapsulating the metal layer.

15. The optical micromirror device of claim 1, wherein the over coating layer and the sub coating layer protect the metal layer from acid or base to maintain reflectivity of the micromirror by encapsulating the metal layer.

16. The optical micromirror device of claim 1, wherein the over coating layer and the sub coating layer protect the metal layer from etchants while removing sacrificial layers.

17. The optical micromirror device of claim 1, wherein the over coating layer and the sub coating layer protect the metal layer from degradation of reflectivity of the metal layer.

18. The optical micromirror device of claim 1, wherein the micromirror device further comprises optically non-effective area wherein the non-effective area comprises:
    a) a substrate;
    b) at least one dummy structure;
    c) a sub coating layer; and
    d) an over coating layer;
wherein the sub coating and the over coating layers are fabricated together with the layers in the micromirror.

19. The optical micromirror device of claim 18, wherein the dummy structures in the non-effective area is fixed and protects the micromirrors in the effective area from external perturbation.

20. The optical micromirror device of claim 18, wherein total thicknesses of the sub coating layer and the over coating layer is controlled to have anti-reflective property of the dummy structures.

21. A micromirror array device having a plurality of micromirrors, wherein each micromirror in optically effective area comprising:
    a) a substrate with at least one electrode to provide actuation force for micromirror motion;
    b) at least one actuation element to make micromirror motion controlled by electrostatic force induced by the electrodes in the substrate;
    c) a micromirror structure having rotational and/or translational motions controlled by the actuation elements;
    d) a sub coating layer deposited on the micromirror structure;
    e) an over coating layer; and
    f) a totally encapsulated metal layer by the sub coating layer and the over coating layer to make the micromirror structure have high reflectivity deposited on the sub coating layer;
wherein the effective area is where spatial light modulating of the micromirror array device occurs.

22. The micromirror array device of claim 21, wherein the micromirrors in the effective area have a shape selected from the group consisting of fan, rectangular, square, hexagonal, triangular, and circular shapes.

23. The micromirror array device of claim 21, wherein the substrate further comprises a control circuitry constructed by using semiconductor microelectronics technologies.

24. The micromirror array device of claim 21, wherein the electrodes are protected by passivation layer wherein the passivation layer prevents the electrodes from possible electric contact with the actuation elements or the micromirror structure.

25. The micromirror array device of claim 21, wherein each micromirror in the effective area is independently controlled to make spatial light modulation.

26. The micromirror array device of claim 21, wherein each micromirror in the effective area is independently controlled to a Micromirror Array Lens having at least an optical surface profile wherein the optical surface profile satisfies convergence and phase matching conditions.

27. The micromirror array device of claim 26, wherein the Micromirror Array Lens is controlled by a common input signal to the electrodes to form an optical surface profile.

28. The micromirror array device of claim 26, wherein the Micromirror Array Lens has a plurality of optical surface profiles to have a variable focusing property.

29. The micromirror array device of claim 21, wherein the sub coating layer is deposited on the micromirror structure with material selected from the group consisting of silicon oxide ($SiO_2$), aluminum oxide ($Al_2O_3$), magnesium oxide (MgO), titanium oxide ($TiO_2$), cesium oxide ($CeO_2$), silicon nitride ($Si_3N_4$), titanium nitride (TiN), magnesium fluoride ($MgF_2$), zinc sulfide (ZnS), zinc selenide (ZnSe), polycarbonate, polyester, polyethylene naphthalate, and fluoropolymer.

30. The micromirror array device of claim 21, wherein the sub coating layer prevents the metal layer from electrical contacting with the micromirror structure.

31. The micromirror array device of claim 21, wherein the sub coating layer prevents the micromirror structure and the actuation elements from galvanic corrosion by electrically separating the micromirror structure from the metal layer.

32. The micromirror array device of claim 21, wherein thickness of the sub coating layer is controlled to have between 20 nm and 500 nm.

33. The micromirror array device of claim 21, wherein the metal layer is made of material selected from the group consisting of silver (Ag), aluminum (Al), gold (Au), nickel (Ni) chromium (Cr), and platinum (Pt) to have high reflectivity.

34. The micromirror array device of claim 21, wherein thickness of the metal layer is controlled to have between 20 nm and 1000 nm.

35. The micromirror array device of claim 21, wherein the over coating layer is deposited on the micromirror structure with material selected from the group consisting of silicon oxide ($SiO_2$), aluminum oxide ($Al_2O_3$), magnesium oxide (MgO), titanium oxide ($TiO_2$), cesium oxide ($CeO_2$), silicon nitride ($Si_3N_4$), titanium nitride (TiN), magnesium fluoride ($MgF_2$), zinc sulfide (ZnS), zinc selenide (ZnSe), polycarbonate, polyester, polyethylene naphthalate, and fluoropolymer.

36. The micromirror array device of claim 21, wherein thickness of the over coating layer is controlled to maximize reflectivity of the metal layer.

37. The micromirror array device of claim 21, wherein thickness of the over coating layer is controlled to have between 20 nm and 500 nm.

38. The micromirror array device of claim 21, wherein the over coating layer and the sub coating layer prevent the metal layer from oxidation by encapsulating the metal layer.

39. The micromirror array device of claim 21, wherein the over coating layer and the sub coating layer protect the metal layer from acid or base to maintain reflectivity of the micromirror by encapsulating the metal layer.

40. The micromirror array device of claim 21, wherein the over coating layer and the sub coating layer protect the metal layer from etchants while removing sacrificial layers.

41. The micromirror array device of claim 21, wherein the over coating layer and the sub coating layer protect the metal layer from degradation of reflectivity of the metal layer.

42. The micromirror array device of claim 21, wherein the micromirror array device further comprises optically non-effective area wherein the non-effective area comprises:
 a) a substrate;
 b) at least one dummy structure;
 c) a sub coating layer; and
 d) an over coating layer;
wherein the sub coating and the over coating layers are fabricated together with the layers in the micromirrors in the effective area.

43. The micromirror array device of claim 42, wherein the dummy structures in the non-effective area is fixed and protects the micromirrors in the effective area from external perturbation.

44. The micromirror array device of claim 42, wherein total thicknesses of the sub coating layer and the over coating layer is controlled to have anti-reflective property of the dummy structures.

45. A micromirror array device comprising:
 an optically effective area with a plurality of micromirrors, wherein the micromirrors in the effective area comprising:
  a) a substrate with at least one electrode to provide actuation force for micromirror motion;
  b) at least one actuation element to make micromirror motion controlled by the electrostatic force induced by the electrodes in the substrate;
  c) a micromirror structure having rotational and translational motions controlled by the actuation elements;
  d) a sub coating layer;
  e) a over coating layer; and
  f) a totally encapsulated metal layer by the sub coating layer and the over coating layer to make the micromirror structure have high reflectivity;
 wherein the effective area is where focusing of the micromirror array device occurs; and
 an optically non-effective area wherein the non-effective area comprises:
  a) a substrate;
  b) at least one dummy structure;
  c) a sub coating layer; and
  d) an over coating layer;
 wherein the sub coating and the over coating layers are fabricated together with the layers in the micromirrors in the effective area.

46. The micromirror array device of claim 45, wherein the micromirrors in the effective area have a shape selected from the group consisting of fan, rectangular, square, hexagonal, and triangular shapes.

47. The micromirror array device of claim 45, wherein the substrate further comprises a control circuitry constructed by using semiconductor microelectronics technologies.

48. The micromirror array device of claim 45, wherein the electrodes are protected by passivation layer wherein the passivation layer prevents the electrodes from possible electric contact with the actuation elements or the micromirror structure.

49. The micromirror array device of claim 45, wherein each micromirror in the effective area is independently controlled to form at least an optical surface profile.

50. The micromirror array device of claim 49, wherein the micromirrors in the effective area are controlled by a common input signal to the electrodes to form an optical surface profile.

51. The micromirror array device of claim 49, wherein the Micromirror array device has a plurality of optical surface profiles to have a variable focusing property.

52. The micromirror array device of claim 45, wherein the sub coating layer is deposited on the micromirror structure with material selected from the group consisting of silicon oxide ($SiO_2$), aluminum oxide ($Al_2O_3$), magnesium oxide (MgO), titanium oxide ($TiO_2$), cesium oxide ($CeO_2$), silicon nitride ($Si_3N_4$), titanium nitride (TiN), magnesium fluoride ($MgF_2$), zinc sulfide (ZnS), zinc selenide (ZnSe), polycarbonate, polyester, polyethylene naphthalate, and fluoropolymer.

53. The micromirror array device of claim 45, wherein the sub coating layer prevents the metal layer from electrical contacting with the micromirror structure.

54. The micromirror array device of claim 45, wherein the sub coating layer prevents the micromirror structure and the actuation elements from galvanic corrosion by electrically separating the micromirror structure and the metal layer.

55. The micromirror array device of claim 45, wherein thickness of the sub coating layer is controlled to have between 20 nm and 500 nm.

56. The micromirror array device of claim 45, wherein the metal layer is made of material selected from the group consisting of silver (Ag), aluminum (Al), gold (Au), nickel (Ni), chromium (Cr), and platinum (Pt) to have high reflectivity.

57. The micromirror array device of claim 45, wherein thickness of the metal layer is controlled to have between 20 nm and 1000 nm.

58. The micromirror array device of claim 45, wherein the over coating layer is deposited on the micromirror structure with material selected from the group consisting of silicon oxide ($SiO_2$), aluminum oxide ($Al_2O_3$), magnesium oxide (MgO), titanium oxide ($TiO_2$), cesium oxide ($CeO_2$), silicon nitride ($Si_3N_4$), titanium nitride (TiN), magnesium fluoride ($MgF_2$), zinc sulfide (ZnS), zinc selenide (ZnSe), polycarbonate, polyester, polyethylene naphthalate, and fluoropolymer.

59. The micromirror array device of claim 45, wherein thickness of the over coating layer is controlled to maximize reflectivity of the metal layer.

60. The micromirror array device of claim 45, wherein thickness of the over coating layer is controlled to have between 20 nm and 500 nm.

61. The micromirror array device of claim 45, wherein the over coating layer and the sub coating layer prevent the metal layer from oxidation by encapsulating the metal layer.

62. The micromirror array device of claim 45, wherein the over coating layer and the sub coating layer protect the metal layer from acid or base to maintain reflectivity of the micromirror by encapsulating the metal layer.

63. The micromirror array device of claim 45, wherein the over coating layer and the sub coating layer protect the metal layer from etchants while removing sacrificial layers.

64. The micromirror array device of claim 45, wherein total thicknesses of the sub coating layer and the over coating layer is controlled to have anti-reflective property of the dummy structures.

65. A method for making a micromirror array device, comprising:
  a) forming electrodes and control circuitry on a substrate;
  b) building micromirror actuation elements with sacrificial layer or layers;
  c) applying a micromirror structure layer;
  d) applying a sub coating layer to the micromirror structure;
  e) applying a metal layer to the sub coating layer on effective area;
  f) applying an over coating layer and totally encapsulating the metal layer by the sub coating layer and the over coating layer;
  g) selectively etching the sub coating layer, the over coating layer and the micromirror structure layer to make micromirror structures;
  h) removing the sacrificial layers and releasing the actuation elements and the micromirror structures;
wherein the effective area is where spatial light modulation of the micromirror array device occurs and wherein the metal layer is encapsulated by the sub coating layer and the over coating layer.

66. The method for making the micromirror array device of claim 65, wherein further comprises a step for building a passivation layer before building the micromirror actuation elements with the sacrificial layers.

* * * * *